Oct. 3, 1939.  R. M. MAGNUSON  2,174,797
PRESSURE REGULATOR
Filed Oct. 7, 1935
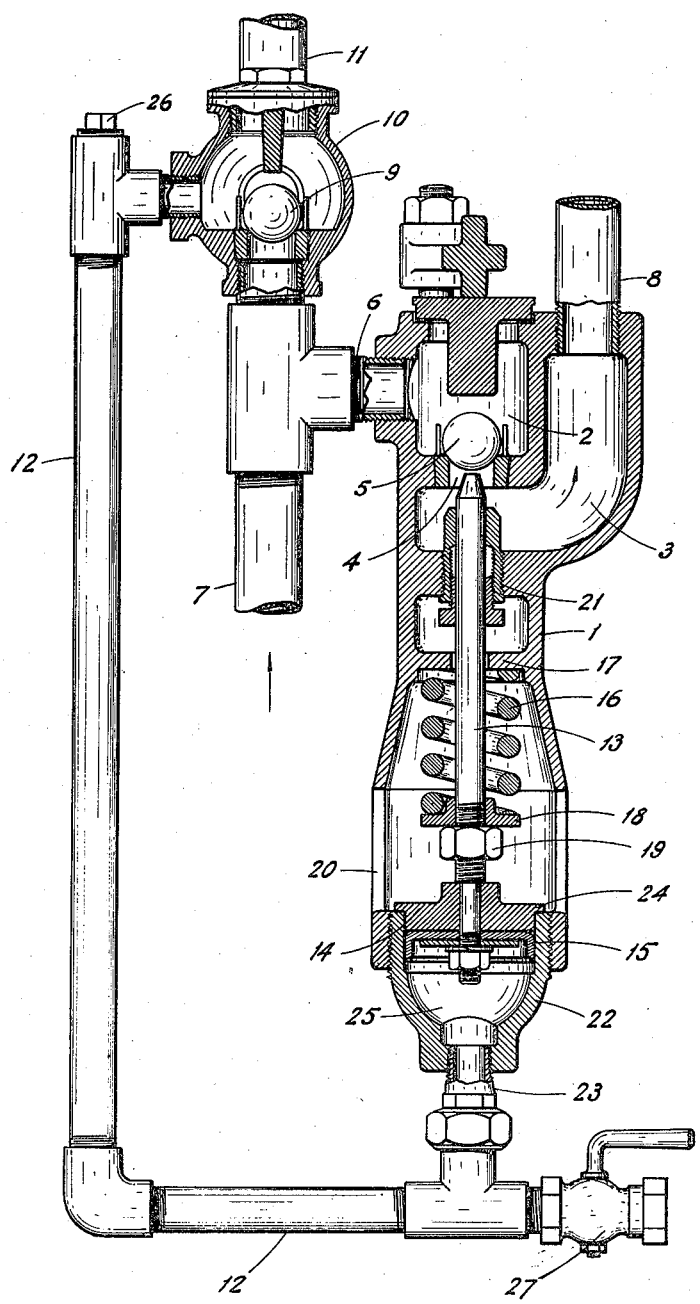
INVENTOR.
Roy. M. Magnuson.
BY Philip A. Minnis
ATTORNEY.

Patented Oct. 3, 1939

2,174,797

UNITED STATES PATENT OFFICE 2,174,797

PRESSURE REGULATOR

Roy M. Magnuson, San Jose, Calif., assignor to Food Machinery Corporation, San Jose, Calif., a corporation of Delaware Application October 7, 1935, Serial No. 43,877

5 Claims. (Cl. 137—153)

This invention relates to improvements in pressure regulators especially adapted for use in connection with continuously operating pumps, as, for example, crop spraying machines.

Such spraying machines usually comprise a pump and a fluid conduit through which the spray liquid is supplied from a common source of supply to one or more spray nozzles for discharge to the desired point of application. Due to the intermittent operation of the spray nozzles by the operator, it is customary to employ a pressure regulator to take care of the difference between the quantity of liquid supplied by the pump, and the quantity actually used by the nozzles, so as to prevent damage to the pump and pressure lines by the back pressure created when a part or all of the spray nozzles are suddenly closed, by permitting the excess liquid to be diverted back to the source of supply.

Pressure regulators utilized for this purpose, ordinarily include a spring compressed plunger or the like which is responsive to the pressure in the discharge conduit to open a relief port valve to a bypass from the discharge conduit to the supply reservoir whenever said pressure exceeds a predetermined maximum. In pressure regulators heretofore in use, the plungers are actuated by direct contact with the liquid being pumped, and the gritty particles and corrosive chemicals usually contained in spray liquids cause excessive wear of the parts contacted, particularly in plunger type regulators, and necessitates frequent adjustment or replacement of these parts. Other types of spray liquids contain material which tends to clog or gum up the plunger assembly, thereby interfering with its operation.

Other factors upon which the sensitivity of the pressure regulator is dependant are the tension adjustment of the spring which holds the plunger depressed, and the amount of clearance between the valve and the stem by which the valve is actuated. These, primarily, are the working parts of the pressure regulator and upon their smooth operation depends the efficiency of the device. It is important, therefore, that these parts, be readily adjustable to compensate for wear and to maintain the device in efficient operative condition.

With the above considerations in view, it is an important object of my invention to provide a pressure regulator which is substantially free from errosive and corrosive action upon its parts due to the liquid the pressure of which is regulated.

It is a further object of my invention to provide against regulator action in response to unsustained pressure increases of very short duration.

Another object is to insure effective lubrication and hence reliable accuracy in operation of the pressure responsive regulator element.

A still further object is to provide for accurate adjustment and alignment of the regulator valve operating parts.

A further object of the invention is to provide a pressure regulator of novel construction having compact, accurate and convenient means for obtaining the desired clearance between the plunger stem and the bypass valve which it actuates.

With such as well as other objects, which will hereinafter become more apparent, in view, the invention will best be understood by reference to the accompanying drawing which illustrates a vertical sectional elevation of a pressure regulator embodying the present invention.

The apparatus illustrated comprises a frame or casing 1, having a valve chamber 2 in its upper portion which communicates with a relief discharge passageway 3 through a port 4 controlled by a gravity seated ball valve 5. A pipe 6 connects the interior of the valve chamber 2 with the pressured supply conduit 7 leading from the pump with which the regulator is to be used. The passageway 3 may be connected with the pump source of supply by means of a pipe 8 which forms a bypass for the return of liquid to the source of supply.

The pressure of the liquid being pumped through the discharge conduit 7 normally holds the ball valve 5 seated so that the liquid flows past a check valve 9 in a valve chamber 10, and into a pipe or hose 11 which leads to the spray nozzles. A pressure conveying pipe 12 connects with the valve chamber 10 and leads to the lower portion of the regulator for a purpose presently to become clear.

Centrally disposed within the casing 1 is a plunger assembly comprising a stem 13, to the lower end of which is affixed a plunger head 14 and associated cup packing 15. Disposed concentrically about the stem 13 is an expansion spring 16 which, by means of a stationary abutment or spring seat 17 and an adjustable collar 18 and nut 19, may be adjusted so as to permit the regulator to operate at desired fluid pressures. The nut 19 is conveniently accessible through the opening 20 in the casing 1 so that it may be turned up or down on the stem 13, as desired, to increase or lessen the tension of the spring 16. A guide bushing 21 is threaded into the upper portion of the casing 1 to hold the stem 13 in alignment with the center of the ball valve 5.

A cup shaped auxiliary casing 22 is threaded at its upper end into the lower end of the casing 1 and its other end is threaded onto a nipple 23 projecting from the pipe 12. By this construction, the casing 22 may be screwed into or out of the upper casing 1 for a purpose presently to be explained. The upper portion of the casing 22 is of cylindrical form as shown for the reception of the piston formed by the plunger 14 and its associated packing cup 15.

It will be noted that the plunger head 14 is formed with a flange 24 which rests upon the upper rim of the auxiliary casing 22 so as to support the entire plunger assembly thereon. As the auxiliary casing 22 is screwed into or out of the casing 1 the plunger assembly is raised and lowered therewith, and the upper end of the stem 13 approaches or recedes from the ball valve 5 accordingly. By this arrangement it is possible to readily and accurately adjust the clearance between the stem 13 and the ball valve 5 so that the valve may be actuated whenever the pressure in the chamber 25 of the casing 22 is increased to lift the plunger assembly even the slightest distance.

By the construction so far described, it will be apparent that the pressure of the liquid being pumped through the conduit 7 will normally hold the regulator valve 5 seated, so that the liquid flows past the check valve 9 and through the pipe 11 to the spray nozzles from whence it will be discharged. The pressure of the liquid is likewise transmitted through the pipe 12 to the underside of the plunger 14, and so long as the pressure does not exceed that required to lift the plunger and unseat the valve 5, the flow of liquid through the pipes 7 and 11 to the spray nozzles will continue.

When conditions arise, however, to increase the back pressure in the discharge line 11 beyond the amount determined by the setting of the regulator spring 16, as by shutting off one or more of the spray nozzles, the increased pressure transmitted through the pipe 12 lifts the plunger 14 against the tension of the spring 16 and the ball valve 5 is unseated. The discharge from the pump flowing through the conduit 7 is thereupon directed back to the source of supply through the port 4, passageway 3 and pipe 8. When the ball valve 5 is lifted from its seat the load on the pump is immediately reduced, it only being required to circulate the spray solution from the source of supply through the conduit 7, connection 6, past ball valve 5, and thence through the pipe 8 back to the source of supply; the check valve 9 in the meantime being held seated by the back pressure in the discharge line 11, said pressure being transmitted through the pipe 12 to the plunger actuating medium in the chamber 25 to lift the plunger assembly until such pressure is exhausted by the spraying operations. When this occurs the plunger head 14 is forced downwardly by the expansion spring 16 and the ball valve 5 again seats itself, closing the passageway 3. Since the pump operates continuously the pressure again builds up in the conduit 7 to lift the ball valve 9 and supply spray solution to the spray nozzles through the pipe 11.

An important feature of the present invention resides in the provision of an actuating medium for the regulator plunger, which is of a different specific gravity than the liquid being pumped. It will be apparent that without the interposition of some such medium, the pumped liquid itself would contact the plunger 14, with the result that, under the pressures required to lift the plunger against the spring tension, the sediment and grit ordinarily contained in spray solutions would be forced between the working surfaces of the plunger and its cylinder, and act to wear and cut these surfaces. Such wear, together with deterioration caused by the corrosive action of spray chemicals, constitutes a source of considerable trouble in the operation of these regulators, and necessitates frequent replacement of the plunger's packings, and associated parts.

I have found that these difficulties can be avoided by the introduction into the chamber beneath the plunger 14 of an actuating medium substantially immiscible with respect to and having a different specific gravity than the spray solution being pumped, thereby providing a buffer between the spray solution and the plunger, which keeps them separated.

Various mediums may be used for the purpose, as for example, oils, greases, or mercury. Where oil or other liquid is used, it may be introduced beneath the plunger by removing the plug 26 and pouring the liquid into the pipe 12 in sufficient quantity to fill the chamber 25. Grease may be introduced in the same manner, preferably by first melting it; or the grease may be conveniently introduced, if in solid form, through the lower end of the pipe 12 by removing the drain cock 27 and forcing it through the cock by a grease gun.

The use of an actuating medium of a lubricating nature is desirable, and I preferably employ a heavy lubricating oil or light grease for the purpose. Due to the difference in their specific gravities from that of the aqueous spray solutions, they serve admirably to prevent the spray solution from contacting the plunger mechanism, and by reason of their lubricant properties, they also minimize wear and improve the operation of the plunger.

By reason of their comparatively high viscosity, the greases and heavier oils also have more or less of a cushioning effect which improves operation of the regulator. In this connection it may be stated that where the spray solution itself is allowed to act directly on the regulator plunger, the fluidity of the solution is such that pressure changes in the discharge line are transmitted to the plunger substantially instantaneously, and frequently result in an undesirable violent vibration of the entire system. It has been found, however, that by the use of the more viscous mediums such as lubricating oils and greases, for actuating the plunger, their viscosity gives rise to a cushioning effect which minimizes the vibration resulting from pressure changes in the discharge line. It will be appreciated that this cushioning effect can be varied according to the viscosity of the actuating medium employed.

It will be understood that the oil, grease, or other actuating medium having a different specific gravity than the liquid being pumped, is introduced into the pipe 12 before the pump is started, and in sufficient quantity, to fill the chamber 25 and to extend up into pipe 12. Thereafter, when the pump is started up, a portion of the spray liquid flows into the pipe 12 into direct contact with the actuating medium previously introduced. The spray liquid and actuating medium being in direct contact within pipe 12 insures that chamber 25 and pipe 12 are completely filled at all times with incompressible fluids regardless of any slight leakage of such medium passed piston 15.

It is believed that the construction, operation and advantages of the apparatus disclosed will be apparent from the foregoing and further that although the invention has been illustrated and described in connection with a pressure regulator of the plunger type, it is believed to be apparent that it can be used with a device wherein the bypass valve is actuated by pressure exerted against a diaphragm, and it is not intended to limit the device to utilization with any particular type of apparatus.

It is understood, of course, that numerous variations and modifications may be made in the particular embodiment disclosed without departing from the scope or spirit of the invention, and I deem myself entitled to all such variations and modifications as fall within the scope of the appended claims.

Having now described my invention and in what manner the same may be used, what I claim as new and desire to protect by Letters Patent is:

1. In a pressure regulator for a fluid pressure line, the combination of a primary casing including a normally closed relief valve for said line, a normally inactive plunger movably mounted within said casing and associated with said valve, an auxiliary casing mounted for adjustment relative to said primary casing and in the direction of movement of said plunger and forming an abutment therefor to control the adjusted position of the plunger with respect to said valve, said plunger being responsive to pressure in said auxiliary casing to actuate said valve, spring means urging said plunger against said abutment and resisting movement of said plunger toward said valve, and means for adjusting said spring means independently of and without disturbing the adjusted position of said plunger relative to said valve.

2. A pressure regulator for a fluid pressure line, comprising a casing connected to the pressure line, a relief passage leading from said casing, a valve seat in said casing operatively related to said passage, a ball valve associated with said seat for closing said passage, a plunger in said casing having an end adjustable towards and away from said ball valve, an auxiliary casing including an expansion chamber adjustably mounted in said casing for axial movement relative thereto, a plunger head connected to said plunger and having a portion engaging said auxiliary casing as an abutment to limit movement of said valve stem in one direction, said plunger head being slidably movable within said chamber, a spring seat mounted on said plunger for axial adjustment therealong, spring means interposed between said seat and a wall of said casing, and means for transmitting pressure from said casing to said chamber to subject said plunger head to the fluid pressure in controlling opening of said valve, the adjustment of said seat along said plunger stem enabling adjustment of said spring means while maintaining the adjusted relation of said plunger end to said ball valve.

3. A pressure regulator for a fluid pressure line, comprising a casing connected to the pressure line, a relief passage leading from said casing, a valve seat in said casing and communicably connected with said passage, a ball valve associated with said seat for closing said passage, a plunger in said casing including a stem having an end thereof adjustable towards and away from said ball valve, an axiliary casing including an expansion chamber adjustably mounted in said casing for inward and outward movement relative thereto, said plunger including a piston head connected to said plunger stem and having a portion engaging said auxiliary casing to limit movement of said valve stem in one direction, said piston head having sliding engagement within said chamber, said stem and said piston head being movable as a unit in adjusting the same relative to said ball valve by adjustment of said auxiliary casing relative to said first mentioned casing, a spring seat mounted on said plunger stem for axial adjustment therealong, spring means interposed between said seat and a wall of said first mentioned casing, and means for transmitting pressure from said casing to said expansion chamber to subject said piston to fluid pressure in controlling opening of said valve, the adjustment of said seat along said valve stem enabling adjustment of said spring means while maintaining the adjusted relation of said plunger stem end to said ball valve.

4. A pressure regulator for a fluid pressure line, comprising a casing connected to the pressure line, a relief passage leading from said casing, a valve seat in said casing communicably connected with said passage, a ball valve normally resting on said seat for closing said passage, a valve actuating stem in said casing having an end thereof adjustable towards and away from said ball valve, an auxiliary casing including an expansion chamber having threaded engagement with said casing to provide inward and outward adjusting movement therebetween, a plunger head connected to said valve actuating stem and having a portion engaging said auxiliary casing to limit movement of said valve stem in one direction, said plunger head slidably engaging within said expansion chamber, spring means associated with said valve stem for maintaining the latter normally inactive relative to said valve, means for adjusting the tension of said spring means independently of the adjusted relation between said stem and said valve, and means for transmitting the pressure of said line to said chamber to subject said piston to fluid pressure in controlling opening of said valve.

5. In a pressure regulator for a fluid pressure line, a casing, a normally closed relief valve in said casing and associated with said line, a valve actuating stem in said casing and adjustable towards and away from said valve, an auxiliary casing including an expansion chamber adjustably mounted in said casing for inward and outward movement relative thereto to vary the distance between said stem and said valve, a plunger head connected to said valve stem for movement as a unit therewith, a said plunger having a portion in abutting engagement with an end of said auxiliary casing and constituting a piston slidably mounted within said chamber, a spring seat adjustably mounted on said stem, and a spring interposed between said seat and a wall of said casing, the tension of said spring being adjustable by movement of said seat on the stem independently of and without varying the distance between said stem and said valve, whereby adjusting movement of said auxiliary casing relative to said first mentioned casing determines the position of the end of said valve actuating stem relative to said valve, and said stem may be moved against the pressure of said spring to open said valve by fluid pressure on said piston.

ROY M. MAGNUSON.